US011383650B2

(12) United States Patent
Fukui et al.

(10) Patent No.: US 11,383,650 B2
(45) Date of Patent: Jul. 12, 2022

(54) BOX APPARATUS FOR VEHICLES

(71) Applicant: TOYODA GOSEI CO., LTD., Kiyosu (JP)

(72) Inventors: Naoyuki Fukui, Kiyosu (JP); Hiroshi Iwata, Kiyosu (JP); Chiharu Totani, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 100 days.

(21) Appl. No.: 17/016,626

(22) Filed: Sep. 10, 2020

(65) Prior Publication Data

US 2021/0086698 A1    Mar. 25, 2021

(30) Foreign Application Priority Data

Sep. 20, 2019    (JP) .............................. JP2019-172345

(51) Int. Cl.
 *B60R 7/04*    (2006.01)
(52) U.S. Cl.
 CPC ..................................... *B60R 7/04* (2013.01)
(58) Field of Classification Search
 CPC ....................................................... B60R 7/04
 USPC ................. 296/24.34, 37.8, 24.46, 153, 37.5
 See application file for complete search history.

(56) References Cited

U.S. PATENT DOCUMENTS

| 4,779,923 A * | 10/1988 | Lang ..................... B60N 2/793 |
| | | 297/217.3 |
| 2009/0058120 A1* | 3/2009 | Ioka ........................ B60R 7/04 |
| | | 296/24.35 |
| 2017/0217284 A1* | 8/2017 | Ji ....................... B60H 1/00978 |
| 2017/0267183 A1* | 9/2017 | Catlin ...................... B60R 7/04 |
| 2018/0236909 A1* | 8/2018 | Choi ..................... B60N 2/767 |
| 2018/0236917 A1* | 8/2018 | Kim ........................ B60R 7/04 |
| 2020/0039400 A1* | 2/2020 | Feineis ................. B60N 2/002 |
| 2020/0346564 A1* | 11/2020 | Dry ...................... B60R 16/027 |

FOREIGN PATENT DOCUMENTS

| JP | 2006-307911 A | 11/2006 |
| JP | 2018-024342 A | 2/2018 |

* cited by examiner

*Primary Examiner* — D Glenn Dayoan
*Assistant Examiner* — E Turner Hicks
(74) *Attorney, Agent, or Firm* — Posz Law Group, PLC

(57) ABSTRACT

A box apparatus for vehicles is disposed to a side of a seat and includes: a box having an internal space having an opening facing upward; and a lid having a lid body and a pivotal shaft integrated with the lid body and pivotally supported relative to the box, configured to open and close the opening of the box, and positionally changed between a closed position where the lid body is disposed above the box and closes the opening, and an opened position where the lid body is disposed at a side of the box and opens the opening. The lid body has an opened-position upper-surface portion becoming an upper surface at the opened position and a closed-position upper-surface portion becoming an upper surface at the closed position and becoming a side surface at the opened position, and a heating element is disposed at the opened-position and closed-position upper-surface portions.

6 Claims, 6 Drawing Sheets

BOX APPARATUS FOR VEHICLES

TECHNICAL FIELD

The present invention relates to a box apparatus for vehicles that includes a box and a lid for opening and closing the box and that is mounted in a vehicle.

BACKGROUND ART

As a box apparatus for vehicles, such as a center console box, which includes a box and a lid for opening and closing the box and which is mounted in a vehicle, a box apparatus in which a lid is positionally changed between an opened position at which the lid opens an opening and a closed position at which the lid closes the opening, has been known (see, for example, Japanese Laid-Open Patent Publication No. 2006-307911 and Japanese Laid-Open Patent Publication No. 2018-24342).

The box apparatus for vehicles of this type is generally disposed to the side of an occupant seated on a seat. Since being disposed to the side of an occupant, the lid of the box apparatus for vehicles of this type, at the closed position, may be used as an arm rest for the occupant.

In recent years, interior equipment for vehicles is required to have many functions. Box apparatuses for vehicles that are usable as arm rests are also required to have further improved functions as arm rests.

In the conventional box apparatus for vehicles disclosed in Japanese Laid-Open Patent Publication No. 2006-307911 or Japanese Laid-Open Patent Publication No. 2018-24342, the lid functions as an arm rest at the closed position at which the lid closes the opening. However, the lid of the conventional box apparatus for vehicles of this type is used as an arm rest only at the closed position.

Moreover, for example, in the box apparatus for vehicles disclosed in Japanese Laid-Open Patent Publication No. 2018-24342, the lid which is usable as an arm rest is cooled or warmed by introducing conditioned air into a lid in a console for vehicles. However, in the box apparatus for vehicles of Japanese Laid-Open Patent Publication No. 2018-24342, only when the lid is at the closed position, conditioned air is introduced into the lid, thereby adjusting the temperature of the lid, i.e., arm rest.

The present invention has been made in view of such circumstances, and an object of the present invention is to provide a box apparatus for vehicles that has an improved function as an arm rest.

A box apparatus for vehicles of the present invention achieving the above object is a box apparatus for vehicles disposed to a side of a seat, the box apparatus for vehicles including:

a box having an internal space with an opening facing upward; and at least one lid having a lid body and a pivotal shaft integrated with the lid body and pivotally supported relative to the box, the lid being configured to open and close the opening of the box, wherein the at least one lid is positionally changed between a closed position at which the lid body is disposed above the box and closes the opening, and an opened position at which the lid body is disposed at a side of the box and opens the opening, and the lid body has an opened-position upper-surface portion that becomes an upper surface at the opened position and a closed-position upper-surface portion that becomes an upper surface at the closed position and that becomes a side surface at the opened position, and a heating element is disposed at the opened-position upper-surface portion and the closed-position upper-surface portion.

The box apparatus for vehicles according to the present invention has an improved function as an arm rest.

FIG. 1 schematically illustrates a box apparatus for vehicles in its disassembled state, according to a first embodiment;

FIG. 2 schematically illustrates the box apparatus for vehicles according to the first embodiment when lid bodies are at a closed position;

FIG. 3 schematically illustrates the box apparatus for vehicles according to the first embodiment when the lid bodies are at an opened position;

Figure 1:
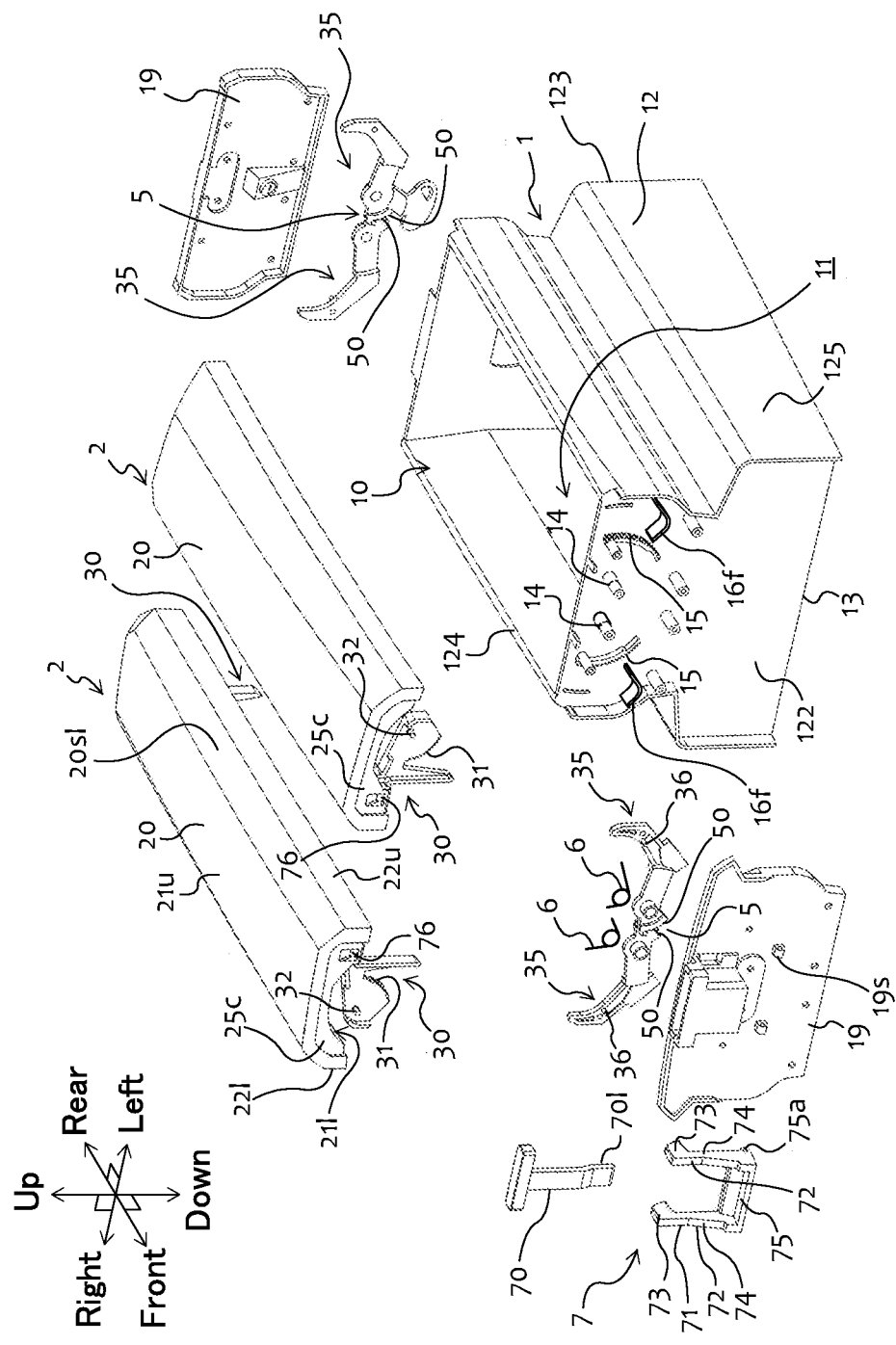

The box apparatus for vehicles according to the present invention is embodied as, but is not limited to, a center console box disposed between a driver seat and a passenger seat. For example, the box apparatus for vehicles according to the present invention is also embodied as a side console box or a container holder. The container holder is disposed to the side of an occupant seat in the rear cabin of a vehicle, and accommodates and holds containers for beverages.

The box apparatus for vehicles according to the present invention includes a box and a lid. The box has an internal space, and an opening that serves as a boundary between the internal space and the outside and that faces upward.

The lid has a lid body and a pivotal shaft.

Of the lid, the lid body is a part that closes the opening at a closed position and opens the opening at an opened position. In addition, the pivotal shaft is a part, of the lid, that is pivotally supported relative to the box. The lid is considered to rotate relative to the box around the pivotal shaft.

When the lid rotates, the lid body is positionally changed between the closed position and the opened position.

When the lid rotates and the lid body is positionally changed between the closed position and the opened position, the direction of the lid body relative to the box is changed. Specifically, at the closed position, the lid body of the lid closes the opening with a closed-position upper-surface portion thereof being an upper surface. In addition, at the opened position, the lid body is disposed to the side of the box, with an opened-position upper-surface portion thereof being an upper surface and with the closed-position upper-surface portion thereof being a side surface, to open the opening.

In the box apparatus for vehicles according to the present invention, a heating element is disposed at the opened-position upper-surface portion and the closed-position upper-surface portion of the lid body. As described above, the opened-position upper-surface portion of the lid body is a portion that becomes an upper surface of the lid body at the opened position, and the closed-position upper-surface portion of the lid body is a portion that becomes an upper surface of the lid body at the closed position. In the box apparatus for vehicles according to the present invention, these portions are warmed by the heating element, whereby, at the opened position, the opened-position upper-surface portion of the lid body can be used as an arm rest having a temperature adjustment function, and, at the closed position, the closed-position upper-surface portion of the lid body can also be used as such an arm rest.

Furthermore, at the opened position, the lid body is disposed to the side of the box with the opened-position upper-surface portion thereof being an upper surface and with the closed-position upper-surface portion thereof being a side surface. At this time, the opened-position upper-surface portion of the lid body faces upward, and the closed-position upper-surface portion and the heating element disposed at the closed-position upper-surface portion face the side of the box. Thus, at the opened position, the heating element of the lid body warms the side of the box. Since the box apparatus for vehicles according to the present invention is disposed to the side of a seat, when the lid body is at the opened position, the seat is considered to be warmed by the heating element at the closed-position upper-surface portion of the lid body. That is, the box apparatus for vehicles according to the present invention not only functions merely as an arm rest and but also functions as a proximity heater that warms a seat and an occupant seated on the seat from a position close to the seat.

As described above, the box apparatus for vehicles according to the present invention is considered to have an improved function as an arm rest.

Hereinafter, the box apparatus for vehicles according to the present invention is described for each of components thereof.

As described above, the box of the box apparatus for vehicles according to the present invention has the internal space, and the opening that serves as a boundary between the internal space and the outside and that faces upward. Therefore, the internal space of the box is partitioned from the outside on at least the sides of the box. In this specification, a part of the box corresponding to the sides that partition the internal space of the box from the outside is referred to as a peripheral wall of the box.

The peripheral wall of the box may continuously or discontinuously surround the internal space of the box over the entire periphery.

The use of the internal space of the box is not particularly limited. For example, the internal space may be used as a chamber for housing articles or a space for installing audio equipment or the like.

As described above, the lid has the lid body and the pivotal shaft integrated with the lid body. Since the pivotal shaft is pivotally supported relative to the box, the lid opens and closes the opening of the box.

The pivotal shaft is a part that is integrated with the aforementioned lid body and pivotally supported relative to the box. Therefore, the lid rotates around the pivotal shaft and is positionally changed between the opened position and the closed position. The pivotal shaft is pivotally supported directly or indirectly relative to the box. That is, the lid may be pivotally supported directly by the box, or may be pivotally supported by the box indirectly via another member. Alternatively, the lid may be pivotally supported by another member that is not in contact with the box and does not positionally change relative to the box.

The pivotal shaft may be integrated directly or indirectly with the lid body. Therefore, for example, the pivotal shaft may be provided directly to the lid body. Alternatively, the pivotal shaft may be provided to a leg portion integrated with the lid body. The leg portion may be composed of a single body or a plurality of separate bodies. For example, the leg portion may be composed of two separate bodies. In this case, one of the two bodies is fixed to the lid body, the other body is pivotally supported by the one body, the pivotal shaft is provided to the other body, and the pivotal shaft is pivotally supported relative to the box. In this case, since the lid body biaxially rotates, the movement locus of the lid body between the opened position and the closed position is advantageously made compact.

In the box apparatus for vehicles according to the present invention, the heating element is disposed at the opened-position upper-surface portion and the closed-position upper-surface portion of the lid body. In the box apparatus for vehicles according to the present invention, the heating element has a heat source and generates heat by itself. For example, the heating element may have a so-called electric heater that generates heat upon receiving power from an electric power source, as a heat source, or may have a so-called chemical heat storage material that generates heat by a chemical reaction, as a heat source. The heating element requires such a heat source, and may have a heat transfer portion through which the heat generated in the heat source is conducted, if necessary. The heat transfer portion may be formed of a material having heat conductivity. For example, a metal having a high heat conductivity and a relatively large heat capacity is preferably used as the heat transfer portion. Specific examples of such a material include metals such as iron and aluminum.

In the case where the heating element is composed of only a heat source, the opened-position upper-surface portion and the closed-position upper-surface portion of the lid body are warmed by the heat source.

Meanwhile, in the case where the heating element has a heat source and a heat transfer portion, heat of the heat source is conducted to a position away from the heat source at the opened-position upper-surface portion and the closed-position upper-surface portion by the heat transfer portion. The box apparatus for vehicles according to the present invention may include merely one heat source or may include two or more heat sources. In the case where the box apparatus for vehicles according to the present invention includes one heat source and one heat transfer portion, the opened-position upper-surface portion and the closed-position upper-surface portion of the lid body are warmed by the same heat source. The number of heat transfer portions may be the same as or different from the number of heat sources.

In any of these cases, the heating element is disposed at the opened-position upper-surface portion and the closed-position upper-surface portion, and may also be disposed at another portion.

The heating element is disposed at the closed-position upper-surface portion and the opened-position upper-surface portion of the lid body, and may also be disposed at the entirety of each of these portions or only at a part of each of these portions. To warm the entirety of the arm rest, the heating element preferably occupies a large part of each of the closed-position upper-surface portion and the opened-position upper-surface portion of the lid body.

Specifically, the heating element occupies preferably 60 area % or greater, more preferably 75 area % or greater, further preferably 90 area % or greater, and particularly preferably 100 area %, of each of the closed-position upper-surface portion and the opened-position upper-surface portion of the lid body. The "area %" means, for example, for the closed-position upper-surface portion, a proportion of the heating element, represented in percentage, to the entirety of the area obtained by projecting the closed-position upper-surface portion in the thickness direction thereof. The same applies to "area %" for the opened-position upper-surface portion and other portions.

The heating element may be disposed only at the closed-position upper-surface portion and the opened-position upper-surface portion of the lid body, but preferably continuously covers the surface of the lid body. That is, the heating element preferably continuously extends from the closed-position upper-surface portion to the opened-position upper-surface portion. The "surface of the lid body" means the design surface, of the lid body, exposed to the outside at the opened position and/or the closed position.

The lid body of the box apparatus for vehicles according to the present invention functions as an arm rest, and an arm of an occupant is put on the opened-position upper-surface portion and the closed-position upper-surface portion of the lid body and the heating element disposed at the opened-position upper-surface portion and the closed-position upper-surface portion. Therefore, in order to impart excellent comfort during use as an arm rest to the lid body, the heating element preferably has flexibility.

More specifically, a heater integrated with a fabric such as a woven fabric, a non-woven fabric, and a knitted fabric is preferably used as the heating element. The heating element of this type is also referred to as a fabric heater.

As the fabric heater, for example, a known fabric heater such as those disclosed in Japanese Laid-Open Patent Publication No. 2017-24185, Japanese Patent No. 5752821, Japanese Patent No. 6174220, International Publication WO 2017/183463, etc., may be used.

The "fabric heater" in the present specification is a generic term for heaters to which flexibility is imparted by a fabric or conductive fibers, such as a heater obtained by integrally weaving or knitting the aforementioned fabric with conductive fibers made of a conductor such as a metal or a conductive resin, and a heater obtained by forming a conductive pattern made of a conductor on the aforementioned fabric.

In order to impart more excellent comfort during use as an arm rest to the lid body, the heating element is preferably overlaid on an elastically deformable cushion portion. Either the heating element or the cushion portion may be disposed on the surface side. In addition, the heating element may be interposed between two cushion portions. In any of these cases, by overlaying the heating element and the cushion portion, excellent elasticity and flexibility caused by the cushion portion are added, thereby further improving comfort during use of the lid body as an arm rest.

When the cushion portion is further overlaid on the heating element disposed at the closed-position upper-surface portion and the opened-position upper-surface portion, for example, an occupant who has hit his/her arm or elbow on the closed-position upper-surface portion or the opened-position upper-surface portion is unlikely or less likely to feel discomfort. Therefore, the box apparatus for vehicles according to the present invention is considered to be suitable as a box apparatus for vehicles to be mounted in a limited space such as a vehicle cabin.

In the lid body in the box apparatus for vehicles according to the present invention, the closed-position upper-surface portion not only becomes an upper surface at the closed position and functions as an arm rest, but also becomes a side surface at the opened position. Since the box apparatus for vehicles according to the present invention is disposed to the side of a seat, the closed-position upper-surface portion of the lid body faces the seat at the opened position.

Since the heating element is disposed at the closed-position upper-surface portion, the heating element disposed at the closed-position upper-surface portion is considered to warm a seat and an occupant seated on the seat from the side of the seat and the occupant, at the opened position.

Here, in cold weather, warming the back and thighs of a human body is considered good. Thus, in order to make an occupant perceive warmth with a small amount of heat, intensively warming the back and thighs of the occupant is reasonable.

The back is covered by the backrest of a seat, and may be warmed by a seat heater. Therefore, the occupant is considered to be more likely to perceive coldness or warmth in the thighs than in the back. In the box apparatus for vehicles according to the present invention, when the lid is at the opened position, a thigh of an occupant seated on a seat is warmed by the heating element disposed at the closed-position upper-surface portion. Accordingly, with the box apparatus for vehicles according to the present invention, efficient air-conditioning is performed such that the occupant perceives a comfortable temperature by a relatively small amount of heat.

In order to more efficiently warm a thigh of an occupant, at least a part of the heating element is preferably located at the same position as the thigh in the up-down direction. Specifically, at the opened position, a part of the closed-position upper-surface portion and a part of the heating element disposed at the closed-position upper-surface portion are preferably disposed below the opening of the box.

At the opened position, a part of the heating element disposed at the closed-position upper-surface portion is preferably disposed above the seating surface of the seat.

At the opened position, the upper end of the heating element disposed at the closed-position upper-surface portion is preferably above the seating surface of the seat, and the distance in the up-down direction between the upper end and the seating surface is preferably not less than 50 mm. In this case, the length, in the up-down direction, of the heating element, i.e., the distance between the upper end and the lower end of the heating element disposed at the closed-position upper-surface portion, is preferably not less than 50 mm.

Examples of more preferable ranges of the aforementioned "distance in the up-down direction between the upper end of the heating element disposed at the closed-position upper-surface portion and the seating surface" include not less than 60 mm, not less than 80 mm, and not less than 120 mm. There is no particular upper limit to the "distance in the up-down direction between the upper end of the heating element disposed at the closed-position upper-surface portion and the seating surface", but examples of preferable ranges thereof include not greater than 300 mm and not greater than 250 mm.

Examples of more preferable ranges of the aforementioned "distance between the upper end and the lower end of the heating element disposed at the closed-position upper-surface portion" include not less than 60 mm, not less than 75 mm, and not less than 100 mm. There is no particular upper limit to the "distance between the upper end and the lower end of the heating element disposed at the closed-position upper-surface portion", but examples of preferable ranges thereof include not greater than 300 mm and not greater than 200 mm.

Meanwhile, since the lid body in the box apparatus for vehicles according to the present invention is used as an arm rest, the lid body preferably has enough strength to bear a load acting on the lid body when being used as an arm rest.

When this point is considered, the lid body in the box apparatus for vehicles according to the present invention preferably includes a base portion harder than the cushion portion.

The base portion is a portion relating to the strength of the lid body. Therefore, as for a material of the base portion, a material having a relatively high strength is preferably selected. Examples of the material of the base portion include resin materials such as polycarbonate, polypropylene, and ABS.

Meanwhile, the cushion portion is a portion relating to the softness of the lid body. The cushion portion satisfies this requirement when it is elastically deformable. The cushion portion may have a solid shape or a hollow shape. In order to impart an excellent cushioning property to the cushion portion, the cushion portion is preferably formed of a porous material such as foamed polyurethane. The cushion portion may have a multilayer structure having a solid skin portion, i.e., a nonporous skin portion, at a surface thereof.

The cushion portion may be overlaid on the heating element disposed at the closed-position upper-surface portion and the opened-position upper-surface portion of the lid body as described above, and may also be overlaid only on a part of the heating element, but is preferably overlaid on a large part of the heating element. Specifically, the cushion portion is overlaid on preferably 60 area % or greater, more preferably 75 area % or greater, further preferably 90 area % or greater, and particularly preferably 100 area %, of the heating element.

Meanwhile, the box apparatus for vehicles according to the present invention may include merely one lid or may include two lids. In the box apparatus for vehicles according to the present invention that includes two lids, each of the two lids is positionally changed between a closed position and an opened position. That is, the box apparatus for vehicles according to the present invention in this case is considered as a so-called double-doored box apparatus.

In this case, specifically, at the closed position, the two lid bodies of the two lids are disposed side by side with closed-position upper-surface portions thereof being upper surfaces. In addition, at the opened position, the two lid bodies of the two lids oppose each other across the opening of the box, with opened-position upper-surface portions thereof being upper surfaces.

The lid body in the box apparatus for vehicles according to the present invention may have any shape as long as the lid body closes and opens the opening. For example, the lid body may have a plate shape, or may have a three-dimensional shape such as a curved shape or a bent shape.

Each of the closed-position upper-surface portion and the opened-position upper-surface portion of the lid body preferably has a certain size enough to be used as an arm rest. The closed-position upper-surface portion is sufficiently large because the opening needs to be closed by this portion. Meanwhile, when reduction in size of the box apparatus for vehicles for installation in a vehicle cabin is considered, the opened-position upper-surface portion of the lid body needs to be smaller than the closed-position upper-surface portion. Therefore, the dimension of the opened-position upper-surface portion is considered to have a desirable range.

Specifically, the width of the opened-position upper-surface portion is preferably not less than 20 mm, more preferably not less than 25 mm, and further preferably not less than 30 mm. The "width of the opened-position upper-surface portion" means the length of the opened-position upper-surface portion in a direction connecting two opposing sides of the box.

In the case where the box apparatus for vehicles according to the present invention includes two lids, the width of the opened-position upper-surface portion is considered as the length of each opened-position upper-surface portion in a direction connecting two lid bodies that oppose each other across the opening at the opened position. Furthermore, for example, when the two lid bodies, at the opened position, oppose each other in the vehicle width direction across the opening, the width of the opened-position upper-surface portion may be rephrased as the length, in the vehicle width direction, of each lid body at the opened position.

The box apparatus for vehicles according to the present invention preferably includes an urging element that urges the lid body from the closed position toward the opened position. In this case, the lid body is automatically positionally changed from the closed position to the opened position by the urging element. Furthermore, in this case, the box apparatus for vehicles according to the present invention preferably includes a locking element that locks the lid body at the closed position against the urging force of the urging element.

The urging element and the locking element are not particularly limited, and a general urging element and locking element may be used.

For example, a torsion coil spring made of metal may be used as the urging element, and a heart cam may be used as the locking element.

As described above, the lid body of the box apparatus for vehicles according to the present invention is usable as an arm rest at the opened position and the closed position. Therefore, the box apparatus for vehicles according to the present invention preferably includes stoppers that regulate the position of the lid body at the opened position and the closed position, respectively. Of the stoppers, a stopper that regulates the position of the lid body at the opened position is referred to as an opening stopper, and a stopper that regulates the position of the lid body at the closed position is referred to as a closing stopper.

In order to efficiently regulate the position of the lid body, the opening stopper and the closing stopper are preferably located at positions away from the center of rotation, i.e., the pivotal shaft, of the lid. The opening stopper and the closing stopper may be provided to a part, of the box apparatus for vehicles, other than the lid body. When the opening stopper and/or the closing stopper is provided to the box, the number of components of the box apparatus for vehicles is not increased, whereby the manufacturing cost is advantageously reduced.

For example, the opening stopper may be in contact with the lid body itself at the opened position to regulate the position of the lid body, may be in contact with the leg portion at the opened position to regulate the position of the lid body via the leg portion, or may be in contact with any of other components of the lid to regulate the position of the lid body. The same applies to the closing stopper.

In any case, the opening stopper and the closing stopper are preferably located at a position away from the pivotal shaft of the lid. Furthermore, as described above, when the lid body multiaxially rotates, such as when the leg portion is composed of a plurality of (two or more) separate bodies, the opening stopper and the closing stopper are preferably located at positions away from all the pivotal shafts.

Although the "position away" means a position that is not physically in contact with the pivotal shaft, the distances between the opening and closing stoppers and the pivotal shaft are preferably larger. Specifically, examples of ranges of preferable distances between the opening stopper and the pivotal shaft include not less than 2 cm, not less than 3 cm, not less than 5 cm, and not less than 7 cm. The preferable distance between the opening stopper and the pivotal shaft has no upper limit, but is preferably not greater than 30 cm for practicality. The same applies to preferable ranges of the distance between the closing stopper and the pivotal shaft.

The box apparatus for vehicles according to the present invention is used as an arm rest. In this regard, the difference between the position, in the up-down direction, of the opened-position upper-surface portion at the opened position and the position, in the up-down direction, of the closed-position upper-surface portion at the closed position is preferably smaller to prevent an occupant from feeling discomfort. The position in the up-down direction means a position in the up-down direction of the box apparatus for vehicles mounted in a vehicle cabin, i.e., a position in the up-down direction with the opening of the box facing upward.

The difference between the position, in the up-down direction, of the opened-position upper-surface portion at the opened position and the position, in the up-down direction, of the closed-position upper-surface portion at the closed position is preferably not greater than 30 mm, more preferably not greater than 20 mm, and particularly preferably not greater than 15 mm.

Hereinafter, the box apparatus for vehicles according to the present invention is described with specific examples.

FIRST EMBODIMENT

A box apparatus for vehicles according to an embodiment is obtained by embodying the box apparatus for vehicles according to the present invention as a center console box to be disposed between a driver seat and a passenger seat.

Figure 2:
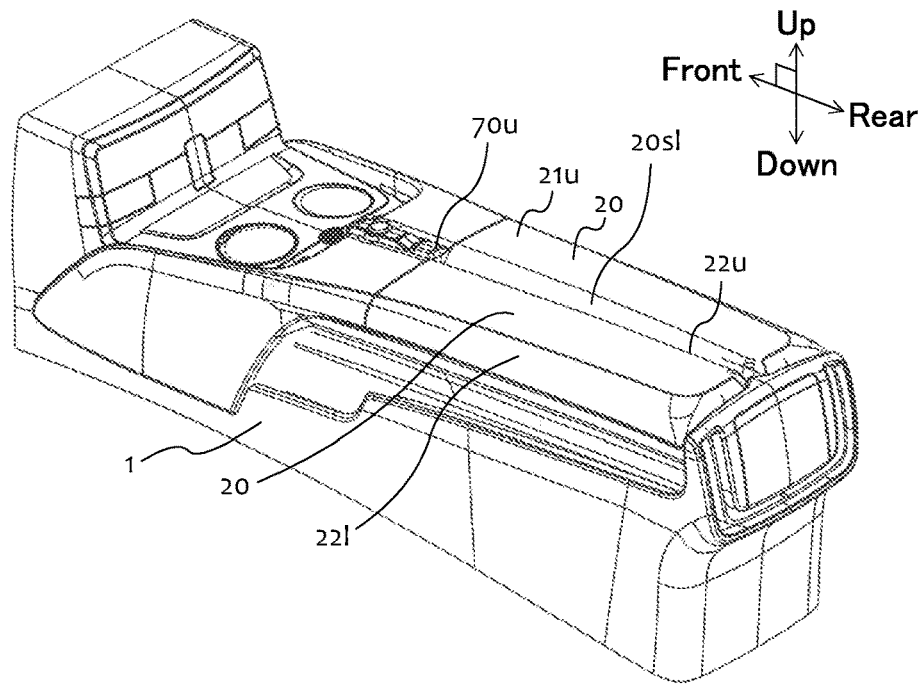
Figure 3:
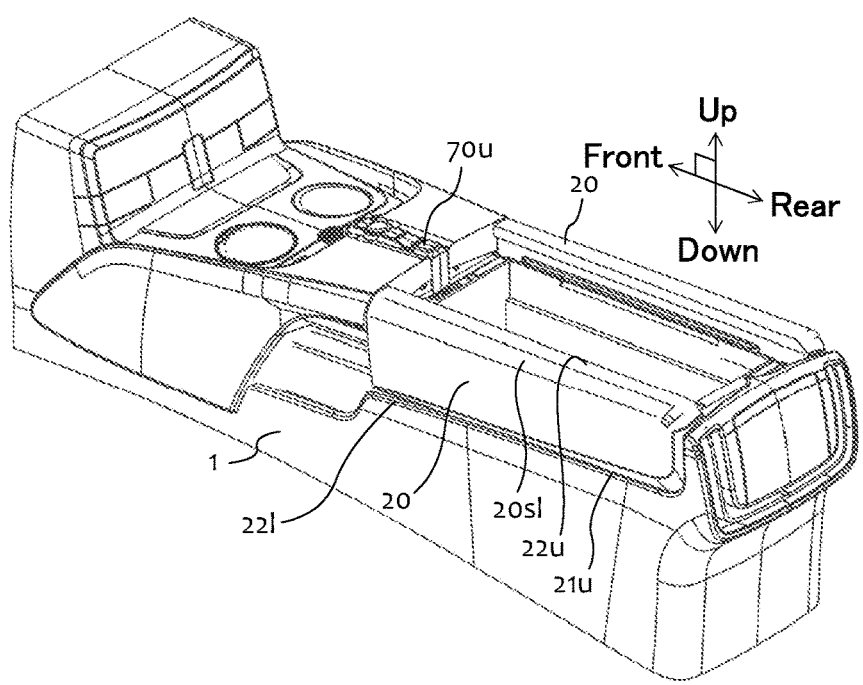
Figure 4:
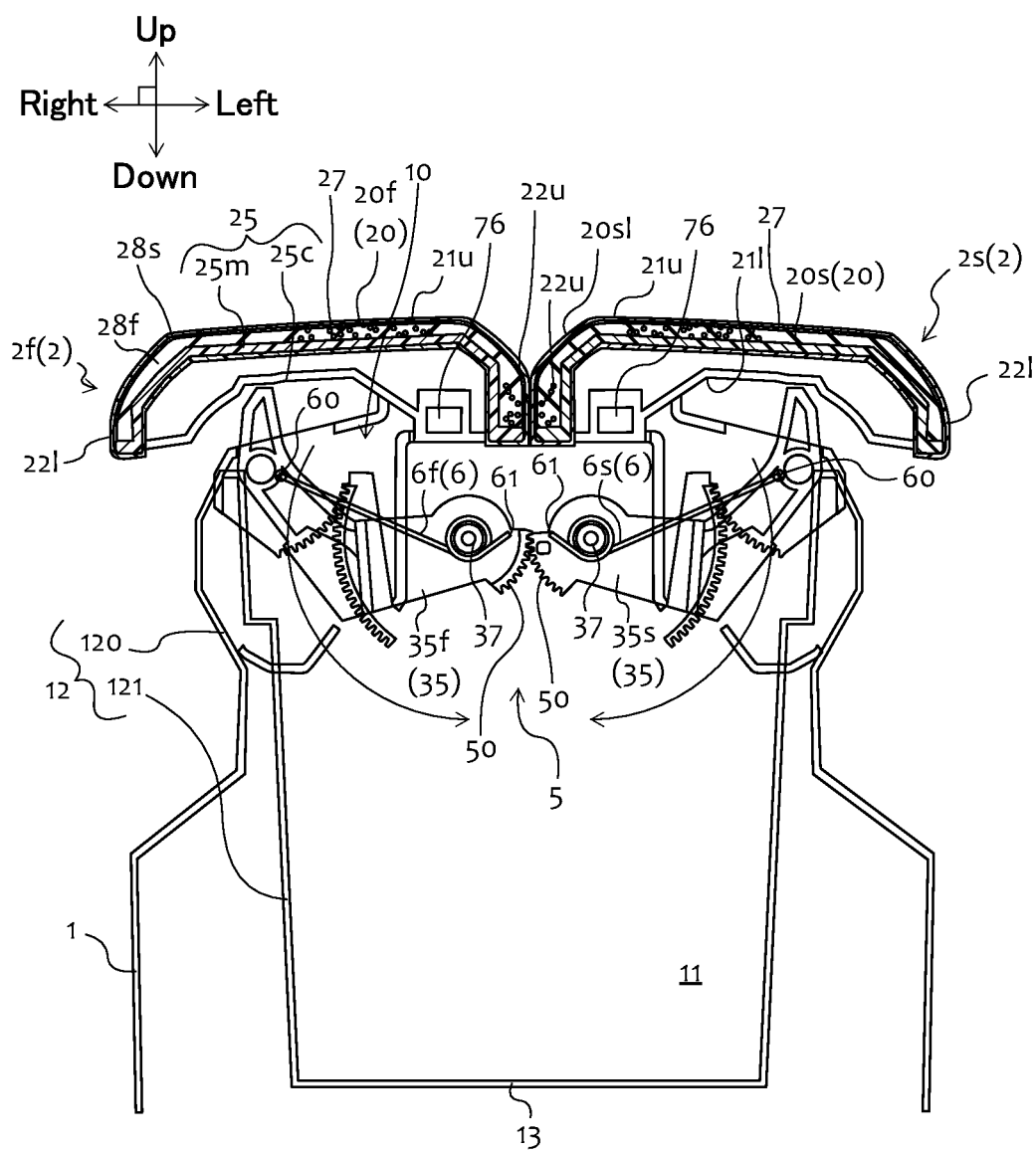
FIG. 4 illustrates an operation of the box apparatus for vehicles according to the first embodiment.
Figure 5:
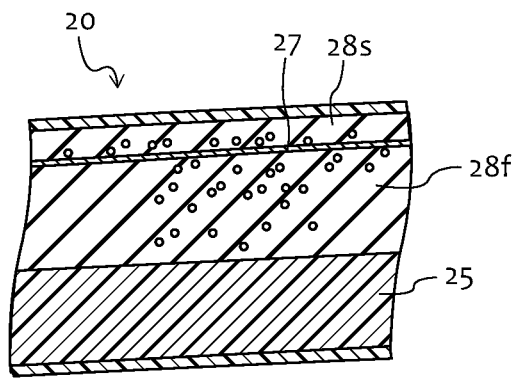
FIG. 5 illustrates a cross-section of the lid body in the box apparatus for vehicles according to the first embodiment.
Figure 6:
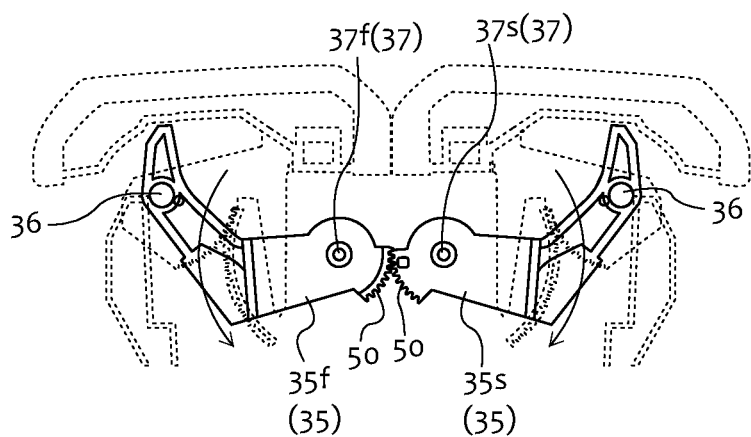
FIG. 6 illustrates the operation of the box apparatus for vehicles according to the first embodiment.
Figure 7:
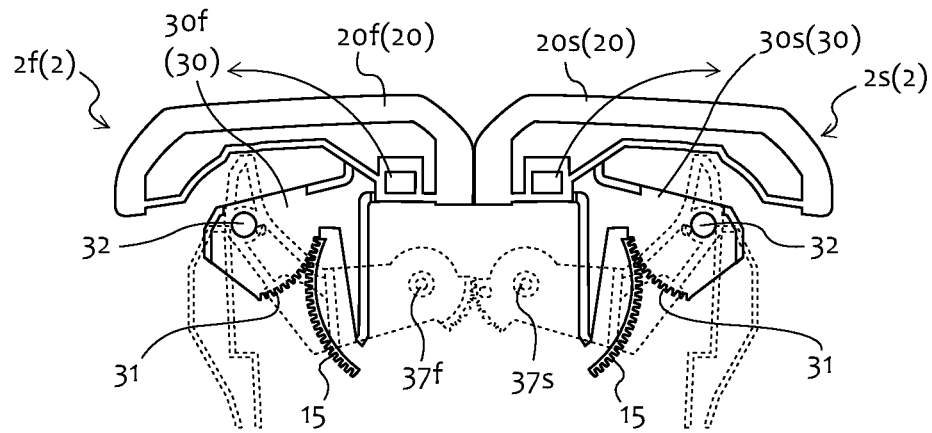
FIG. 7 illustrates the operation of the box apparatus for vehicles according to the first embodiment.
Figure 8:
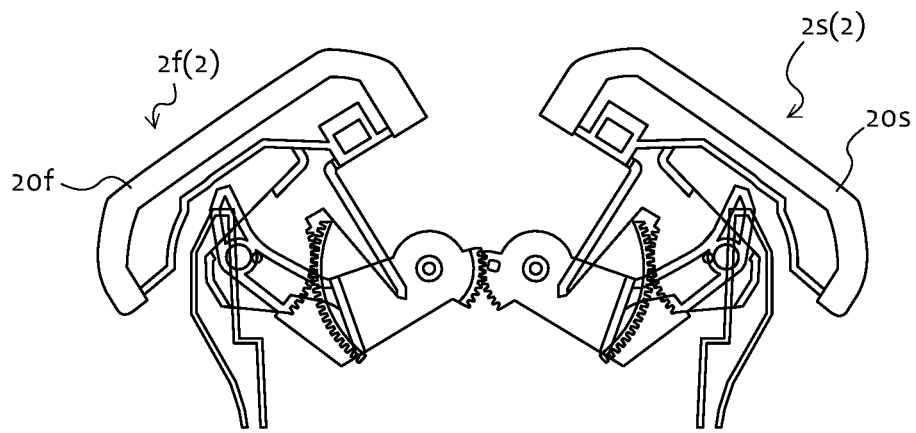
FIG. 8 illustrates the operation of the box apparatus for vehicles according to the first embodiment.
Figure 9:
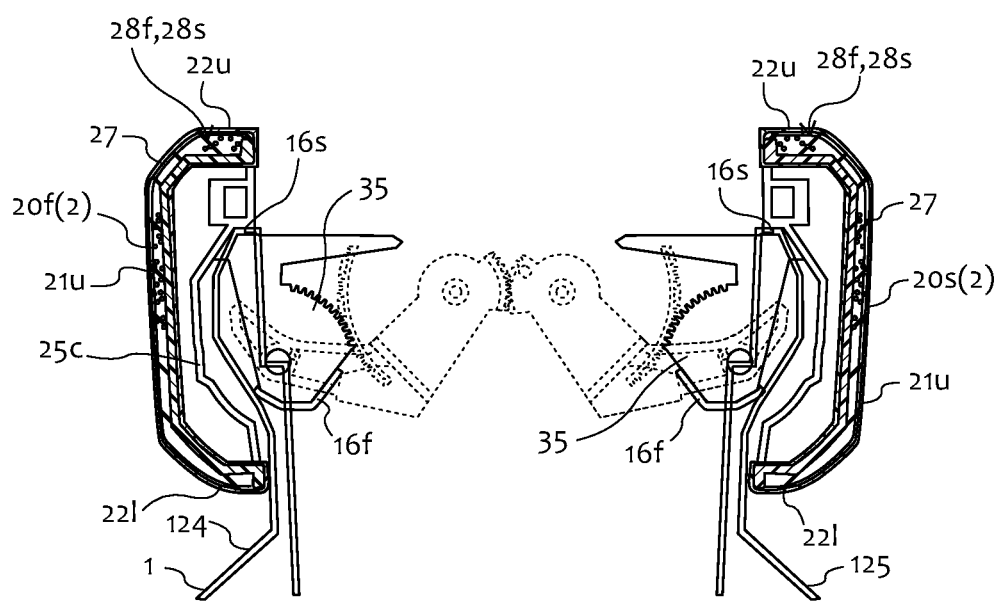
FIG. 9 illustrates the operation of the box apparatus for vehicles according to the first embodiment.
Figure 10:
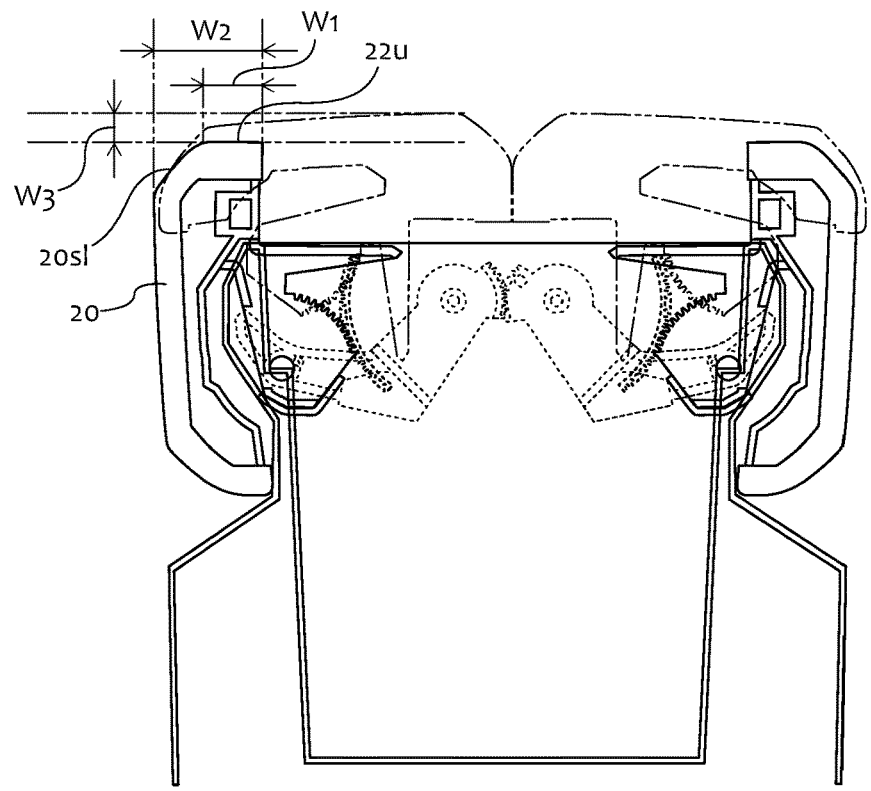
FIG. 10 illustrates the dimensions of each portion in the lid bodies of the box apparatus for vehicles according to the first embodiment.
Figure 11:
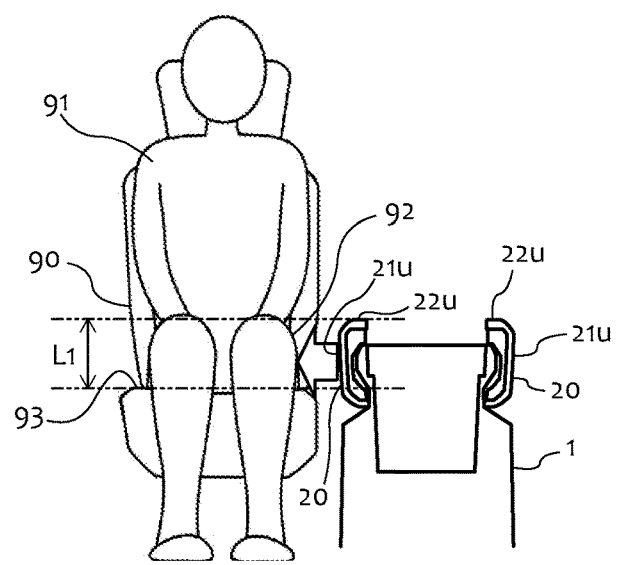
FIG. 11 schematically illustrates a state where the box apparatus for vehicles according to the first embodiment is mounted in a vehicle.

FIG. 1 schematically shows a box apparatus for vehicles in a disassembled state, according to a first embodiment. FIG. 2 schematically shows the box apparatus for vehicles according to the first embodiment in which lid bodies are at a closed position. FIG. 3 schematically shows the box apparatus for vehicles according to the first embodiment in which the lid bodies are at an opened position. FIG. 4 and FIG. 6 to FIG. 9 illustrate the operation of the box apparatus for vehicles according to the first embodiment. Specifically, FIG. 4, FIG. 6, and FIG. 7 show the box apparatus for vehicles according to the first embodiment in which the lid bodies are at the closed position, FIG. 9 shows the box apparatus for vehicles according to the first embodiment in which the lid bodies are at the opened position, and FIG. 8 shows the box apparatus for vehicles according to the first embodiment in which the lid bodies are at a half-opened position between the closed position and the opened position. FIG. 5 illustrates a cross-section of the lid body in the box apparatus for vehicles according to the first embodiment. FIG. 10 illustrates the dimensions of each portion in the lid bodies of the box apparatus for vehicles according to the first embodiment. FIG. 11 schematically illustrates a state where the box apparatus for vehicles according to the first embodiment is mounted in a vehicle.

According to need, the box apparatus for vehicles with the lid bodies being at the closed position is referred to as "closed state", the box apparatus for vehicles with the lid bodies being at the opened position is referred to as "opened state", and the box apparatus for vehicles with the lid bodies being at the half-opened position is referred to as "semi-opened state".

Furthermore, up, down, left, right, front, and rear respectively refer to up, down, left, right, front, and rear shown in FIG. 1. The up-down direction is the vertical direction, the left-right direction is a vehicle width direction, and the front-rear direction is a vehicle traveling direction.

The box apparatus for vehicles according to the first embodiment includes a box 1, two covers 19, two lids 2, two link elements 5, two urging elements 6, and a locking element 7.

As shown in FIG. 1, the box 1 has a box shape whose longitudinal direction is the front-rear direction. The box 1 has an internal space 11 having an opening 10 facing upward. The internal space 11 is partitioned from the outside at the sides and the bottom thereof by a peripheral wall 12 and a bottom wall 13 of the box 1. As shown in FIG. 4, the peripheral wall 12 of the box 1 has a double-layer structure having an inner peripheral wall 121 and an outer peripheral wall 120. The bottom wall 13 of the box is integrated with the inner peripheral wall 121 of the peripheral wall 12.

A part, of the outer peripheral wall 120 of the box 1, located on the front side is referred to as a front outer peripheral wall 122, and a part, of the outer peripheral wall 120, located on the rear side is referred to as a rear outer peripheral wall 123.

Each of the front outer peripheral wall 122 and the rear outer peripheral wall 123 has two pivotal shaft receiving portions 14, two guide racks 15, and two first opening stoppers 16f. The two pivotal shaft receiving portions 14 pivotally support pivotal shafts 37 described later. The two guide racks 15 mesh with guide gear trains 31 provided in lid leg portions 30 described later. Each guide rack 15 has an arc shape centered around the corresponding pivotal shaft receiving portion 14. At the opened position, the two first opening stoppers 16f are in contact with link leg portions 35 described later.

Furthermore, the front side of the front outer peripheral wall 122 and the rear side of the rear outer peripheral wall 123 are covered with the covers 19. The covers 19 are fixed to the corresponding front outer peripheral wall 122 and rear outer peripheral wall 123.

Box apparatus constituting members, such as the pivotal shaft receiving portions 14, the guide racks 15, as well as the urging elements 6, the link leg portions 35, the lid leg portions 30, and the locking element 7, which are described later, are housed between the cover 19 and the front outer peripheral wall 122 and between the cover 19 and the rear outer peripheral wall 123.

Each of the two lids 2 has a lid body 20, two lid leg portions 30, and two link leg portions 35. Each of the link leg portions 35 is integrated with one of link gear trains 50 constituting the link element 5. The link element 5 is described later.

Each lid body 20 has a substantially rectangular shape and a substantially plate shape as shown in FIG. 1 to FIG. 3, and the longitudinal direction thereof is the front-rear direction. Each lid body 20 has: a closed-position upper-surface portion 21u which is an upper surface at the closed position shown in FIG. 2; a closed-position lower-surface portion 211 which is a lower surface at the closed position (see FIG. 1 and FIG. 4); an opened-position upper-surface portion 22u which is an upper surface at the opened position shown in FIG. 3; and an opened-position lower-surface portion 221 which is a lower surface at the opened position. At the closed position shown in FIG. 2 and FIG. 4, the closed-position lower-surface portion 211 opposes the internal space 11 of the box 1. At the closed position, the opened-position upper-surface portion 22u is located inside in the left-right direction, i.e., the vehicle width direction, and the opened-position lower-surface portion 221 is located outside in the vehicle width direction.

A part of each lid body 20 between the closed-position upper-surface portion 21u and the opened-position upper-surface portion 22u is chamfered to form a sloped surface 20s1.

As shown in FIG. 4, each lid body 20 has a base portion 25, a heating element 27, a first cushion portion 28f, and a second cushion portion 28s. The base portion 25 is formed from an acrylonitrile-butadiene-styrene copolymer resin (so-called ABS resin), and has a plate shape. The base portion 25 is obtained by assembling and integrating two separate bodies, i.e., a base body 25m and a base cover 25c. The base body 25m is covered with the first cushion portion 28f at a part on the closed-position upper-surface portion 21u side, a part on the opened-position upper-surface portion 22u side, and a part on the opened-position lower-surface portion 221 side. The first cushion portion 28f is composed of a foamed polyurethane layer, and is elastically deformable and softer than the base portion 25.

As shown in FIG. 4 and FIG. 5, the heating element 27 is overlaid on the surface of the first cushion portion 28f. In the box apparatus for vehicles according to the first embodiment, the heating element 27 is continuously disposed at substantially the entire surface of the closed-position upper-surface portion 21u, substantially the entire surface of the opened-position upper-surface portion 22u, substantially the entire surface of sloped surface 20s1, and the opened-position lower-surface portion 221.

The heating element 27 in the box apparatus for vehicles according to the first embodiment is a fabric heater. The heating element 27 is connected to an electric power source (not shown) via a lead wire (not shown). The fabric heater functions as a heat source that generates heat upon receiving power from the electric power source.

As shown in FIG. 5, the second cushion portion 28s is further overlaid on the surface of the heating element 27. The second cushion portion 28s is composed of a foamed polyurethane layer slightly thinner than the first cushion portion 28f, and a skin layer formed on the surface of the foamed polyurethane layer. The heating element 27 in the box apparatus for vehicles according to the first embodiment is interposed between the two foamed polyurethane layers.

The first cushion portion 28f and the second cushion portion 28s correspond to a cushion portion in the box apparatus for vehicles according to the present invention.

As shown in FIG. 4, the base cover 25c is integrated with the base body 25m so as to cover the base body 25m at a part on the closed-position lower-surface portion 211 side. The base cover 25c is provided with a recessed lock receiving portion 76 which constitutes a part of the locking element 7 described later.

As shown in FIG. 1, the lid leg portion 30 is integrally provided to each of both end portions in the longitudinal direction of each base cover 25c, i.e., to each of a front end portion and a rear end portion of each base cover 25c. The respective lid leg portions 30 each have a guide gear train 31 which meshes with the guide rack 15, and are pivotally supported by different link leg portions 35.

Specifically, as shown in FIG. 7, each lid leg portion 30 is provided with a protruding pivotal support portion 32. As shown in FIG. 6, each link leg portion 35 is provided with a recessed pivotal support portion 36. The pivotal support portion 32 of each lid leg portion 30 is inserted in the pivotal support portion 36 of the corresponding link leg portion 35, and each lid leg portion 30 is pivotally supported by the corresponding link leg portion 35. The aforementioned guide gear train 31 is arranged in an arc shape centered around the pivotal support portion 32 which is provided on the same lid leg portion 30.

As shown in FIG. 6, each link leg portion 35 has a pivotal shaft 37 in addition to the pivotal support portion 36 described above. Each pivotal shaft 37 is pivotally supported by each of two pivotal shaft receiving portions 14 (see FIG. 1) provided on each of the front outer peripheral wall 122 and the rear outer peripheral wall 123 of the box 1. Therefore, each lid 2 is considered to be pivotally supported by the box 1 via the corresponding pivotal shaft 37.

As shown in FIG. 4, the urging element 6 is mounted to each of the two pivotal shafts 37 pivotally supported at the front outer peripheral wall 122. The urging element 6 is a torsion coil spring. One end 60 of the urging element 6 is mounted to the link leg portion 35, and another end 61 thereof is mounted to the cover 19. In other words, the one end of the urging element 6 is mounted to the lid 2, and the other end thereof is mounted to the box 1 via the cover 19. Due to an urging force of the urging element 6, the lid 2 is urged from the closed position shown in FIG. 2 and FIG. 4 toward the opened position shown in FIG. 3 and FIG. 9.

The box apparatus for vehicles according to the first embodiment includes the two link elements 5. The link elements 5 are integrated with a front part and a rear part of the lid 2. As shown in FIG. 4, each link element 5 is composed of two link gear trains 50 integrated with the respective link leg portions 35. Each of the two link gear trains 50 is a gear train arranged in an arc shape centered around the pivotal shaft 37 which is provided on the same link leg portion 35. The two link gear trains 50 mesh with each other.

As shown in FIG. 1, the locking element 7 has a switch portion 70 and a lock portion 71. The switch portion 70 is mounted between the front outer peripheral wall 122 and the cover 19. The switch portion 70 has a substantially rod-like shape. As shown in FIG. 2 and FIG. 3, an upper end 70u of the switch portion 70 is exposed on the upper side of the box 1. A lower end 701 of the switch portion 70 shown in FIG. 1 is located on the front side of an input portion 75 of the lock portion 71 described later, between the front outer peripheral wall 122 and the cover 19 covering the front outer peripheral wall 122.

As shown in FIG. 1, the lock portion 71 has two hook portions 72 and an input portion 75. Each hook portion 72 has a hook-shaped hook head portion 73 and a rod-shaped hook leg portion 74. The input portion 75 has a rod shape and connects the two hook portions 72. The lock portion 71 has a substantially U-shape as a whole. The hook portions 72 are disposed substantially in the up-down direction with the hook head portions 73 facing upward. The input portion 75 connects the lower ends of the hook leg portions 74. A pivotal shaft 75a of the input portion 75 is pivotally supported by a support portion 19s of the cover 19, and the lock portion 71 rotates relative to the cover 19.

The lock portion 71 is urged by an urging force of a lock urging element (not shown) around the pivotal shaft 75a of the input portion 75 in a direction in which the hook head portions 73 are brought close to the rear side, i.e., the lids 2. The hook head portions 73 urged by the lock urging element are engaged with the lock receiving portions 76 of the lid bodies 20 at the closed position. Engagement of the hook head portions 73 with the lock receiving portions 76 causes the lid bodies 20 to be locked at the closed position.

The input portion 75 of the lock portion 71 is disposed below the lower end 701 of the switch portion 70. Therefore, when the switch portion 70 is pressed downward, the input portion 75 is pressed downward. Thus, the lock portion 71 rotates in a direction in which the hook head portions 73 move away from the lids 2, around the pivotal shaft 75a of the input portion 75, against the urging force of the lock urging element. Therefore, at this time, the engagement of the hook head portions 73 with the lock receiving portions 76 is canceled.

The operation of the box apparatus for vehicles according to the first embodiment is described below.

At the closed position shown in FIG. 2 and FIG. 4, the lid bodies 20 cover the opening 10 of the box 1, with the closed-position upper-surface portions 21u facing upward. At this time, the lid bodies 20 are locked at the closed position by the locking element 7. At this time, each lid body 20 is in contact with a part of the upper surface of the box 1, although not shown in the drawings. This part of the box 1 functions as a closing stopper, and supports the lid body 20 from the lower side. Therefore, at this time, the lid body 20 is stably maintained at the closed position.

As shown in FIG. 4, the heating element 27 is disposed at the closed-position upper-surface portion 21u of each lid body 20. The closed-position upper-surface portion 21u is warmed by the heating element 27 generating heat upon receiving power from the electric power source. The heating element 27 is a fabric heater, and the heating element 27 itself has flexibility. Thus, the texture of the closed-position upper-surface portion 21u is not impaired by the heating element 27. Therefore, the lid body 20 at the closed position is suitably used as an arm rest.

As shown in FIG. 5, the first cushion portion 28f and the second cushion portion 28s are overlaid on the heating element 27. Since the first cushion portion 28f and the second cushion portion 28s are elastically deformable and softer than the base portion 25, more excellent texture is imparted to the closed-position upper-surface portion 21u. Thus, the lid body 20 at the closed position is suitably used as an arm rest.

Furthermore, the lid body 20 is supported from the lower side by the closing stopper (not shown) as described above and thereby the position of the lid body 20 is regulated. Thus, further positional change of the lid body 20 in the closing direction is inhibited, and a load acting on the lid body 20 is received by the closing stopper. Accordingly, the lid body 20 at the closed position is suitably used as an arm rest.

As shown in FIG. 7, when each lid body 20 is at the closed position, the guide gear train 31 of each lid leg portion 30 meshes with the upper part of the guide rack 15. The two link gear trains 50 constituting the link element 5 mesh with each other at the upper portions thereof. Hereinafter, according to need, one of the two lids 2 is referred to as a first lid 2f, and the other lid 2 is referred to as a second lid 2s. The lid body 20 of the first lid 2f is referred to as a first lid body 20f, and the lid body 20 of the second lid 2s is referred to as a second lid body 20s. Of the two lids 2, one located on the right side in FIG. 4 is the first lid 2f, and one located on the left side in FIG. 4 is the second lid 2s.

According to need, the lid leg portion 30 integrated with the front part of the first lid body 20f is referred to as a first lid leg portion 30f, and the lid leg portion 30 integrated with the front part of the second lid body 20s is referred to as a second lid leg portion 30s. Furthermore, according to need, the link leg portion 35 pivotally supporting the first lid leg portion 30f is referred to as a first link leg portion 35f, the link leg portion 35 pivotally supporting the second lid leg portion 30s is referred to as a second link leg portion 35s, the pivotal shaft 37 provided in the first link leg portion 35f is referred to as a first pivotal shaft 37f, the pivotal shaft 37 provided in the second link leg portion 35s is referred to as a second pivotal shaft 37s, the urging element 6 mounted to the first pivotal shaft 37f of the first link leg portion 35f is referred to as a first urging element 6f, and the urging element 6 mounted to the second pivotal shaft 37s of the second link leg portion 35s is referred to as a second urging element 6s.

In the closed state shown in FIG. 4, the first urging element 6f and the second urging element 6s are compressed to store the urging forces therein.

Therefore, in the closed state, a counterclockwise urging force in FIG. 4, which is caused by the first urging element 6f, acts on the first link leg portion 35f. Meanwhile, a clockwise urging force in FIG. 4, which is caused by the second urging element 6s, acts on the second link leg portion 35s.

As described above, at this time, the first lid body 20f and the second lid body 20s are locked at the closed position by the locking element 7. Therefore, the first link leg portion 35f and the second link leg portion 35s are also maintained at the closed position shown in FIG. 4, against the urging forces of the first urging element 6f and the second urging element 6s.

When the switch portion 70 of the locking element 7 is pressed downward, the engagement of the hook head portions 73 of the lock portion 71 with the lock receiving portions 76 of the lids 2 is canceled as described above.

Then, as shown in FIG. 6, the urging force of the first urging element 6f (not shown) causes the first link leg portion 35f to rotate counterclockwise in FIG. 6 around the first pivotal shaft 37f. Moreover, the urging force of the second urging element 6s (not shown) causes the second link leg portion 35s to rotate clockwise in FIG. 6 around the second pivotal shaft 37s. Since the first link leg portion 35f and the second link leg portion 35s are synchronized with each other by the two link gear trains 50 of the link element 5, the rotation speed of the first link leg portion 35f and the rotation speed of the second link leg portion 35s at this time are substantially equal to each other.

At this time, the pivotal support portion 36 of the first link leg portion 35f moves downward along an arc centered around the first pivotal shaft 37f. Therefore, the pivotal support portion 32, of the first lid leg portion 30f, in which the pivotal support portion 36 is inserted also moves downward along the same arc. Likewise, the pivotal support portion 36 of the second link leg portion 35s moves downward along an arc centered around the second pivotal shaft 37s. Therefore, the pivotal support portion 32, of the second lid leg portion 30s, in which the pivotal support portion 36 is inserted also moves downward along the same arc.

As shown in FIG. 7, each of the guide gear train 31 of the first lid leg portion 30f and the guide gear train 31 of the second lid leg portion 30s meshes with the corresponding guide rack 15. Thus, each of the first lid leg portion 30f and the second lid leg portion 30s moves downward while being guided by the corresponding guide rack 15 and rotated. Therefore, at this time, as shown in FIG. 7, the first lid leg portion 30f and the first lid body 20f integrated with the first lid leg portion 30f biaxially rotate around the corresponding pivotal shaft 37 and pivotal support portion 32, while the second lid leg portion 30s and the second lid body 20s integrated with the second lid leg portion 30s also biaxially rotate around the corresponding pivotal shaft 37 and pivotal support portion 32.

Specifically, the first lid leg portion 30f and the first lid body 20f rotate counterclockwise in FIG. 7 around the pivotal support portion 32 of the first lid leg portion 30f. Since the pivotal support portion 32 rotates counterclockwise around the first pivotal shaft 37f, the first lid body 20f is considered to biaxially rotate around the pivotal support portion 32 of the first lid leg portion 30f and around the first pivotal shaft 37f.

Moreover, the second lid leg portion 30s and the second lid body 20s rotate clockwise in FIG. 7 around the pivotal support portion 32 of the second lid leg portion 30s. Since the pivotal support portion 32 of the second lid leg portion 30s rotates clockwise around the second pivotal shaft 37s, the second lid body 20s is considered to biaxially rotate around the pivotal support portion 32 of the second lid leg portion 30s and around the second pivotal shaft 37s.

Since the first lid body 20f and the second lid body 20s biaxially rotate as described above, the first lid body 20f and the second lid body 20s are positionally changed with small movement loci such that the closed-position upper-surface portion 21u is an upper surface at the closed position and is a side surface at the opened position as described later. Therefore, the box apparatus for vehicles according to the first embodiment is favorably mounted in a vehicle cabin that has a limited space.

The states of the first lid 2f, the second lid 2s, and the link element 5 are changed to the opened state shown in FIG. 9 through the semi-opened state shown in FIG. 8. The first lid body 20f and the second lid body 20s biaxially rotate to the opened position shown in FIG. 9 through the half-opened position shown in FIG. 8.

At the opened position shown in FIG. 9, each of the first lid body 20f and the second lid body 20s has the opened-position upper-surface portion 22u facing upward and the closed-position upper-surface portion 21u facing sideward. At this time, the base cover 25c of the first lid body 20f comes into contact with the upper surface of a right-side outer peripheral wall 124 of the box 1, and the base cover 25c of the second lid body 20s comes into contact with the upper surface of a left-side outer peripheral wall 125 of the box 1. Therefore, the upper surfaces of the right-side outer peripheral wall 124 and the left-side outer peripheral wall 125 of the box 1 function as second opening stoppers 16s, whereby rotation of the lids 2 stops.

More specifically, at this time, each second opening stopper 16s supports the lid body 20 from the lower side to regulate the position of the lid body 20. Therefore, further positional change of the lid body 20 in the opening direction is inhibited, and a load acting on the lid body 20 is received by the second opening stopper 16s.

As shown in FIG. 9, the heating element 27 is also disposed at the opened-position upper-surface portions 22u of the first lid body 20f and the second lid body 20s. Therefore, the first lid body 20f and the second lid body 20s are also suitably used as arm rests at the opened position.

Moreover, as shown in FIG. 9, also at each opened-position upper-surface portion 22u, the first cushion portion 28f and the second cushion portion 28s are overlaid on the heating element 27. Thus, the first lid body 20f and the second lid body 20s are also suitably used as arm rests at the opened position.

Furthermore, at this time, the closed-position upper-surface portion 21u is also warmed by the heating element 27.

As shown in FIG. 11, the box apparatus for vehicles according to the first embodiment is disposed to the side of a seat 90. At the opened position, the closed-position upper-surface portion 21u of the lid body 20 is disposed to the side of the box 1 and faces the seat 90.

Therefore, the closed-position upper-surface portion 21u is considered to also function as a proximity heater that warms a thigh 92 of an occupant 91 seated on the seat 90 from a close position.

In the box apparatus for vehicles according to the first embodiment, at the opened position, about ⅔ of the closed-position upper-surface portion 21u is disposed below the opening 10. In addition, the heating element 27 disposed at the closed-position upper-surface portion 21u is also disposed below the opening 10. Since a part of the closed-position upper-surface portion 21u is disposed below the opening 10 at the opened position and the heating element 27 is also disposed at the closed-position upper-surface portion 21u which is below the opening 10 as described above, the positions, in the up-down direction, of the closed-position upper-surface portion 21u and the heating element 27 are substantially the same as that of the thigh 92 of the occupant 91 seated on the seat 90. Therefore, with the box apparatus for vehicles according to the first embodiment, the thigh 92 of the occupant 91 is very efficiently warmed by the heating element 27 disposed at the closed-position upper-surface portion 21u.

In the box apparatus for vehicles according to the first embodiment, at the opened position, the upper end of the heating element 27 disposed at the closed-position upper-surface portion 21u of the lid body 20 is above a seating surface 93 of the seat 90. At the opened position, a distance L1 in the up-down direction between the seating surface 93 of the seat 90 and the upper end of the heating element 27 disposed at the closed-position upper-surface portion 21u is about 200 mm, and the distance between the upper end and the lower end of the heating element 27 disposed at the closed-position upper-surface portion 21u is about 150 mm.

As shown in FIG. 10, a width W1 of the opened-position upper-surface portion 22u of each lid body 20, i.e., the length of the opened-position upper-surface portion 22u in the vehicle width direction, is 20 mm which is sufficiently long. Therefore, the occupant is allowed to stably put his/her arm on the opened-position upper-surface portion 22u. The heating element 27, the first cushion portion 28f, and the second cushion portion 28s are also disposed at the sloped surface 20s1 continuous to the opened-position upper-surface portion 22u (see FIG. 9) and are usable as an arm rest. A sum W2 of the width of the sloped surface 20s1 and the width of the closed-position upper-surface portion 21u is 35 mm which is longer than the width W1 of the opened-position upper-surface portion 22u. Furthermore, the sloped surface 20s1 is chamfered and therefore is soft to the touch. Thus, excellent comfort during use is imparted to the box apparatus for vehicles according to the first embodiment.

In the box apparatus for vehicles according to the first embodiment, a difference W3 between the position, in the up-down direction, of the opened-position upper-surface portion 22u (indicated by a solid line in FIG. 10) at the opened position and the position, in the up-down direction, of the closed-position upper-surface portion 21u (indicated by a chain double-dashed line in FIG. 10) at the closed position is 10 mm which is very small. Therefore, regardless of whether the lid body 20 is at the opened position or the closed position, the occupant is allowed to use the lid body 20 as an arm rest without feeling discomfort. Also, in this regard, the box apparatus for vehicles according to the first embodiment is considered to be excellent in comfort during use.

Furthermore, at the opened position, each of the base covers 25c of the two lid bodies 20 comes into contact with the upper surface of the right-side outer peripheral wall 124 or the left-side outer peripheral wall 125 of the box 1, i.e., the corresponding second opening stopper 16s, from the upper side. Since the second opening stopper 16s comes into contact with the base cover 25c, of the lid 2, located away from the pivotal shaft 37, each lid body 20 is stably maintained at the opened position. Therefore, the arm of the occupant is stably supported by the lid body 20, thereby further improving the comfort during use of the lid body 20 as an arm rest.

Moreover, as shown in FIG. 9, when the two lid bodies 20 are positionally changed to the opened position, the link leg portions 35 of the lid bodies 20 come into contact with the first opening stoppers 16f. Then, further rotation of the link leg portions 35 is inhibited by the first opening stoppers 16f. Thus, each lid body 20 is stably maintained at the opened position, thereby further improving the comfort during use of each lid body 20 as an arm rest.

To rotate each lid body 20 at the opened position to the closed position to change the state of the box apparatus for vehicles from the opened state to the closed state, the occupant may manually rotate the lid body 20 from the opened position to the closed position against the urging force of the urging element 6. At this time, since the two lids 2 are synchronized with each other by the link element 5, the occupant only needs to rotate one of the lid bodies 20 from the opened position to the closed position.

The lock portion 71 of the locking element 7 is urged by the lock urging element so as to bring the hook head portion 73 close to the rear side, i.e., the lid 2. Therefore, at the lower side of each lid body 20 turned from the half-opened position to the closed position, the hook head portion 73 interferes with the lid body 20. However, as shown in FIG. 1, an upper rear part of the hook head portion 73 has a sloped surface from the upper and front side toward the lower and rear side. Therefore, the lid body 20 that comes into contact with the hook head portion 73 relatively slides on the sloped surface of the hook head portion 73, whereby the hook head portion 73 rotates frontward against the urging force of the lock urging element. Thus, the lid body 20 rotates toward the closed position without being stopped by the hook head portion 73 of the lock portion 71.

When the two lid bodies 20 rotate to the closed position, the hook head portions 73 of the lock portion 71 are again engaged with the lock receiving portions 76 of the lid bodies 20. Thus, the lid bodies 20 are locked at the closed position, and the lids 2 are maintained in their closed state.

The present invention is not limited to the embodiment described above and shown in the drawings, but may be modified as appropriate without deviating from the gist of the present invention. Furthermore, components described in the present specification including the embodiments may be optionally extracted and combined to be implemented.

The invention claimed is:

1. A box apparatus for vehicles disposed to a side of a seat, the box apparatus for vehicles comprising:
   a box having an internal space with an opening facing upward; and
   at least one lid having a lid body and a pivotal shaft integrated with the lid body and pivotally supported relative to the box, the lid being configured to open and close the opening of the box, wherein
   the at least one lid is positionally changed between a closed position at which the lid body is disposed above the box and closes the opening, and an opened position at which the lid body is disposed at a side of the box and opens the opening,
   the lid body has an opened-position upper-surface portion that becomes an upper surface at the opened position and a closed-position upper-surface portion that becomes an upper surface at the closed position and that becomes a side surface at the opened position, and a heating element is disposed at the opened-position upper-surface portion and the closed-position upper-surface portion,
   the lid body has an elastically deformable cushion portion and a base portion harder than the cushion portion,
   the heating element and the cushion portion are overlaid on each other, and
   the cushion portion is overlaid on both the heating element disposed at the opened-position upper-surface portion and the heating element disposed at the closed-position upper-surface portion.

2. The box apparatus for vehicles of claim 1, wherein the cushion portion is overlaid on a surface of the heating element which is located on a design surface side of the lid body.

3. The box apparatus for vehicles of claim 2, wherein the cushion portion comprises a first cushion portion and a second cushion portion, and
the heating element is interposed between the first cushion portion and the second cushion portion.

4. The box apparatus for vehicles of claim 1, wherein the heating element is configured to warm the seat and an occupant seated on the seat from the side of the seat and the occupant when the lid is at the opened position.

5. The box apparatus for vehicles of claim 1, wherein the lid body is disposed to a side of the box with the opened-position upper-surface portion being an upper surface and with the closed-position upper-surface portion being a side surface when the lid is at the opened position.

6. The box apparatus for vehicles of claim 1, wherein the heating element occupies 60 area % or greater of each of the closed-position upper-surface portion and the opened-position upper-surface portion of the lid body.

* * * * *